June 14, 1960 — N. V. FRYE — 2,940,423
FARROWING PEN
Filed June 23, 1958 — 2 Sheets-Sheet 1
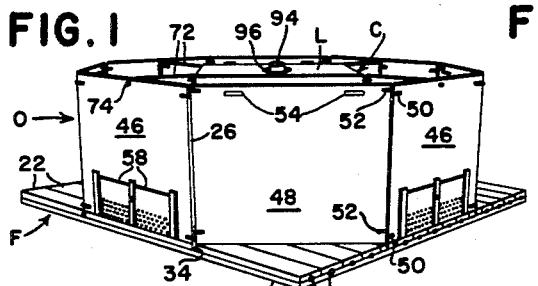
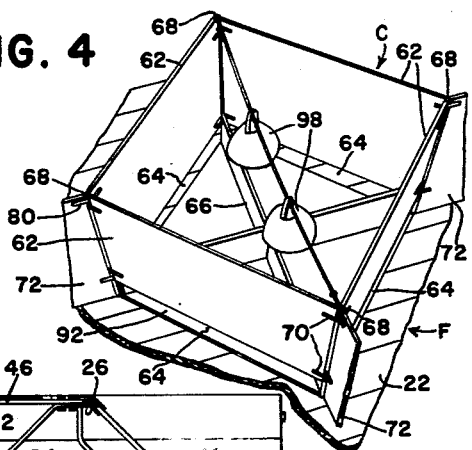
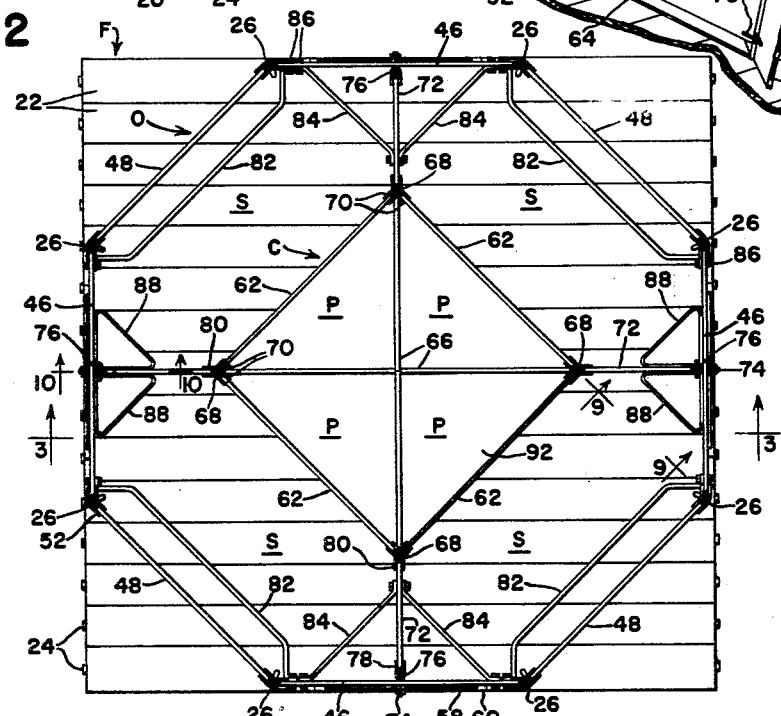
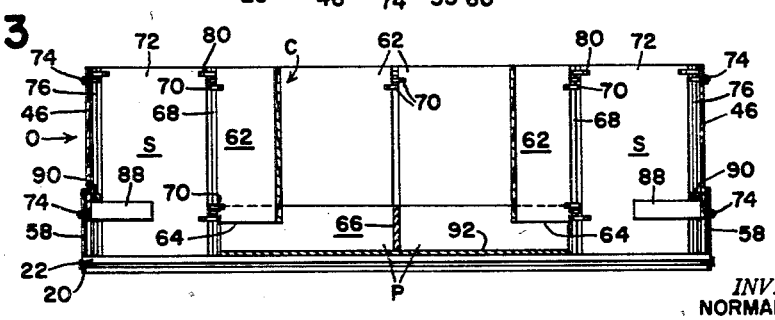
INVENTOR.
NORMAN FRYE
BY
ATTORNEY June 14, 1960
N. V. FRYE
2,940,423
FARROWING PEN
Filed June 23, 1958
2 Sheets-Sheet 2
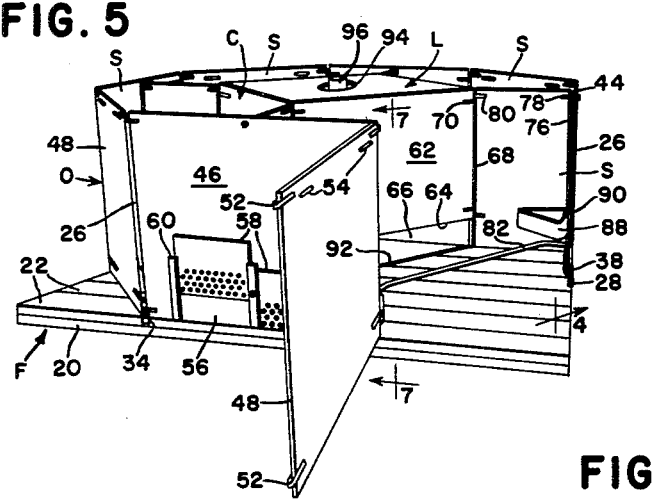
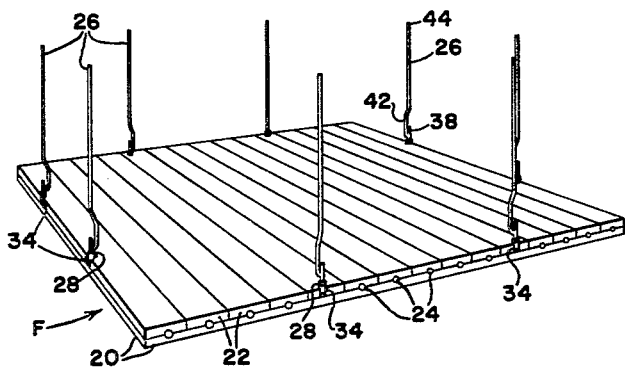
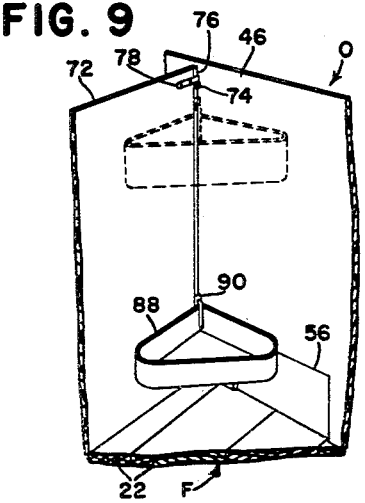
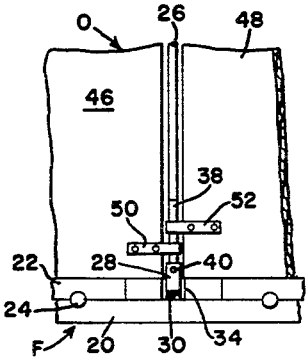
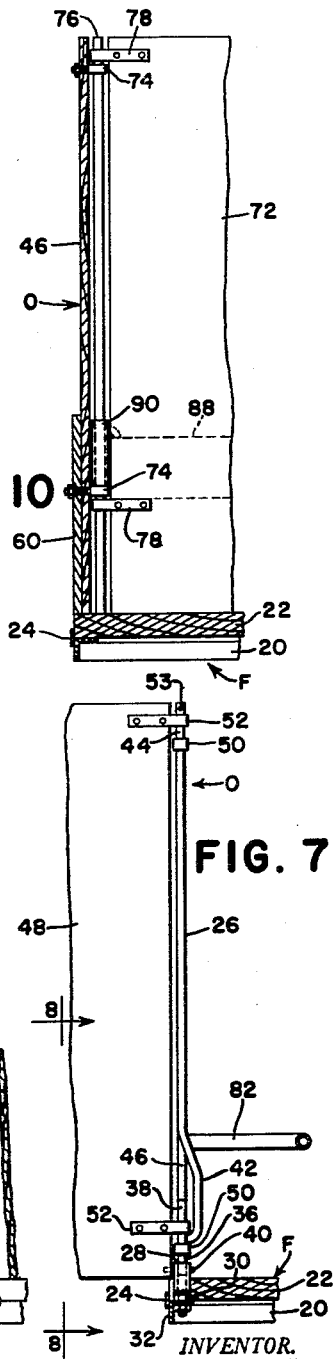
INVENTOR.
NORMAN FRYE
BY
ATTORNEY

# United States Patent Office 2,940,423
Patented June 14, 1960

2,940,423
FARROWING PEN

Norman V. Frye, R.R. 4, near Davenport, Iowa

Filed June 23, 1958, Ser. No. 743,715

14 Claims. (Cl. 119—20)

This invention relates to a farrowing pen for pigs and like animals and more particularly to a pen of the multi-compartment type.

Although many types and designs of farrowing pens are known, most if not all of them suffer from one or more disadvantages and none is know that combines all known advantages with simplicity, low-cost design and ease of use. Nor do prior structures embody means for readily exploiting modern methods of feeding, care etc. According to the present invention, a novel, low-cost pen structure is provided which is completely portable and self-contained; can be used in any type building, barn etc.; may be independently heated and/or ventilated; can be used singly or in multiples; is convenient not only for farrowing, feeding etc. but confines the sows and small pigs for medical attention and other care; is readily accessible from outside, which eliminates the need for one to enter the pen; and is of knock-down construction that lends itself to ready manufacture, shipment, storage, assembly and disassembly. Other features include improved means for heating and ventilating the structure, means for easy removal of manure and litter, adjustable feed pens, inexpensive multi-panel construction, novel floor construction, and improved control of the sows in getting them into and out of their respective individual compartments. In addition, the improved structure includes such known features as individual compartmentation of the small pigs, protection of the small pigs, etc.

Other important objects and features, inherent in and encompassed by the invention, will become apparent to those versed in the art as a preferred embodiment of the invention is disclosed by way of example in the ensuing specification and accompanying sheets of drawings, the several figures of which are described below.

Figure 1 is a perspective of the structure.

Figure 2 is an enlarged plan with the central lid or cover removed.

Figure 3 is a section on the line 3—3 of Figure 2.

Figure 4 is a perspective of the central part of the structure.

Figure 5 is a perspective similar to Figure 1 but showing one panel in an open position.

Figure 6 is a perspective of the floor and hinge post sub-assembly.

Figure 7 is an enlarged view, partly in section, as seen along the line 7—7 of Figure 5.

Figure 8 is a view as seen along the line 8—8 of Figure 7.

Figure 9 is an enlarged view, partly in section, as seen along the line 9—9 of Figure 2.

Figure 10 is an enlarged view, partly in section, as seen along the line 10—10 of Figure 2.

The basic components of the pen comprise a floor F, an outer annular wall structure O, an inner or central compartmented structure C and a detachable cover or lid L.

The floor as shown is preferably square and is constructed of four steel members 20 of L-section, bolted or otherwise secured together to form a square frame, and this frame carries a plurality of planks or equivalent wooden members 22. These are arranged in suitable flooring fashion, and two opposite frame members 20 rigidly carry a plurality of end stops 24, which may be metal disks or washers welded to the steel members. These prevent endwise displacement of the planks 22. As best seen in Figures 7 and 10, the L-section of the frame enables the planks 22 to be slightly elevated from the ground or floor of the building in which the pen is used, thus improving drainage through the joints between the planks, as well as serving to insulate the animals from the cold ground. Moreover, since the inventive structure features portability as contrasted to prior art pens in the form of special buildings as such, the floor as part of the pen is a significant advantage. As seen, the floor itself is of knock-down design.

The floor frame members 20 rigidly but detachably mount a plurality of hinge or mounting posts 26, here eight in number and arranged at the eight corners of a regular octagon, which is the shape of the outer wall structure O. Each hinge post is connected to the floor by a tubular or socketed element 28, here a short length of steel tubing to the lower end of which a bolt 30 is welded (Figures 7 and 8). The frame members 20 are suitably apertured to receive these bolts, which are equipped with nuts 32 below the frame members to rigidly mount the tubes 28. As a step in facilitating assembly, the nuts 32 may be pre-welded in place. As best seen in Figure 6, certain of the planks are notched at 34 to accommodate the elements 28, and this arrangement in conjunction with the end stops 24 confines the planks against horizontal shifting relative to the floor frame and further enables the planks to rigidify the steel members 20.

Each hinge post is preferably a steel or iron rod having a lower portion 36 received by and rising from the associated socket or tube 28 to afford a lower upright hinge pin 38. A removable cross pin or cotter 40 is employed to secure the post to its socket, the post and socket being suitably apertured for that purpose. The cross aperture in the socket may be preliminarily used to receive a rod etc. for tightening the socket to its nut. No precision fit of the posts in their sockets is required, because the wall structure, to be described, adds rigidity to the posts and further holds down the floor planks 22. Moreover, a certain amount of flexibility is desired to facilitate opening, closing, mounting and dismounting of certain parts of the wall structure as will presently appear.

Each post 26 further has an elongated upper portion welded at its bottom to the part 36 and formed with a lateral crook or offset 42 to clear the lower hinge pin 38, but the major part of the upper portion is straight so that its upper end affords an upper hinge pin 44 vertically coaxial with the lower hinge pin 38.

The outer annular wall structure O is preferably in the form of a regular octagon, as already referred to generally, and, although this particular shape is significant, certain features of the inventive concept can be readily adapted to other shapes, especially polygonal shapes, particularly in view of the construction of the wall structure of sheets or panels, preferably weather-resistant plywood. In the octagonal form disclosed here, there are of course eight separate panels having upright meeting edges respectively at the post 26. These panels are similar as to size and shape, being rectangular and measuring approximately four feet in length and three feet in height. These dimensions can of course be varied and they are referred to here only in the interests of indicating a size and pattern that have proven successful.

In the assembled wall structure O, four alternate panels become fixed panels 46 and the four remaining panels are movable panels 48. All of these panels are mounted by the eight hinge positions 26, the panels 46 having vertically spaced end straps or post-receiving loops 50 and the panels 48 being similarly equipped at 52. Figures 7 and 8 best show that the straps or loops 50 and 52 are secured to their respective panels 46 and 48 with the straps 52 uppermost so that the panels 46 are installed first on the post and the panels 48 are mounted last on the pins 38 and 44, whereby each panel 48 may be lifted off the hinge pins at both or either of its ends. It should be noted also that each lower strap 50 on the panel 46 is received by the post lower part 36 below the offset 42. Since the post is pinned at 40 to its floor-carried socket element 28, the panel 46 cannot become inadvertently displaced upwardly. The strap and post arrangement enables a panel 48 to be released at one end from its hinge pins 38 and 44 while retaining connection with the hinge pins of the opposite post, whereby the panel 48 may be swung about the last-named post as a hinge (Figure 5). This result is possible at either end so that the panel 48 may be selectively swung from either end, depending upon the direction in which a sow is being guided to her compartment. In this respect, the hinge pins 38—44 and their cooperating panel straps 52 serve a dual function: as a hinge and as a releasable lock means. Cotters 53 are used used in the tops of the posts 26 to retain the panels 48 against undesired vertical displacement.

Moreover, the panels 48 may be individually removed completely and used as a board to guide and pursue the sow. The aforesaid flexibility of the hinge posts affords sufficient temporary distortion of the structure to permit the above removability or bi-directional hinging of the panels 48. When all panels are assembled and in closed positions, the outer wall structure is sufficiently rigid for its purpose, especially when tied in to the remaining structure about to be described. Hand holes 54 are provided in the panels 48 to facilitate handling and use thereof. Each fixed panel 46 has a pair of lower openings 56 therein and each of these has a closure or cover 58 mounted for vertical sliding movement between open and closed positions as well as being settable in intermediate positions. Each closure has one-half thereof perforated and the other half imperforate and is removable from its guides 60 for reversability. When the covers are fully opened, the uncovered openings 56 are useful as clean-out openings. When the covers are installed perforated side down, they permit circulation of air. When reversed, they close the openings 56 entirely.

The central structure comprises an inner annular wall made up of four identical panels 62 similar to the panels 46 and 48, except that the panels 62 do not have the height of the panels 46 and 48 but instead are spaced above the floor F so as to afford four lower openings 64 for ingress and egress of small pigs as respects the annular space afforded between the inner and outer structures C and O because the latter concentrically surrounds the former. The square design of the structure C enables the use of panels like those at 46 and 48 except of lesser height, as aforesaid, which facilitates production of the pen components. Since each panel 62 has the same length as each panel 46 or 48, the surrounded square arrangement places the four panels 62 respectively parallel to the four swingable panels 48 and places the four corners of the square respectively in radial alinement with midportions of the fixed panels 46 (Figure 2). In this respect, the square design is of novel significance but, like the octagon of the outer wall, it has features that may be exploited in other shapes.

The central structure is compartmented by partition means comprising a pair of relatively low, upright intersecting boards 66 which are diagonals of the square central structure, and the ends of these boards are closely nested respectively in four inside corners of the structure. Four central posts or pins 68, preferably steel rods, which need not be secured to the floor and merely rest thereon are provided at these corners for mounting the panels 62 via straps or loops 70. The partition boards 66 establish four small-pig compartments P in the central structure C, and these communicate via the ingress and egress openings 64 with four outer or sow compartments S in which the annular space between the inner and outer structure C and O is divided by four upright radial partitions 72 which extend outwardly respectively from the four central corner posts 68 to the mid portions of the respective fixed panels 46. The octagon-square arrangement enables the use of partitions 72 of the same material and having the same height as but one-half the length of the panels 46 and 48.

Each panel 46 has at its midportion a pair of vertically alined loops such as eye bolts 74 (Figure 10) which receive posts or rods 76, here the same as the rods 68 and likewise not secured to the floor F. Each partition 72 has vertically spaced outer loops or straps 78, received by the associated outer rod 76, and similar inner straps 80, received by the associated central rod 68. The straps 78 and 80 are appropriately staggered on the rods 68. The outer ends of the inner partition boards 66 may be notched or other means used to fix the height of the panels 62 above the floor so as to provide the openings 64. Figure 10 shows that the lower strap 78 on the partition 72 is below the lower eye 74 on the fixed panel 46 and, in addition, appropriate cotters may be used where desired to prevent vertical displacement of the panels but on the whole, the interlocked structure has more than adequate rigidity and strength.

As best seen in Figure 2, each sow compartment S is relatively long and narrow and is pointed or convergent at each of its opposite ends, being thus generally "boat" shaped. This size and shape, as constituted by angularly related end panels comprising at each end a panel 72 and half the adjacent panel 46, plus the use of a long guard bar 82 and a short guard bar 84 in each compartment S, loosely confines the sow but does prevent her turning about end for end, thus compelling her to keep her head at one end and her rear at the other and to lie parallel to the associated panel 62 or long guard bar 82. These bars are of conventional height above the floor F, the bar 82 being removably secured to neighboring fixed panels 46 and the short bar 84 being removably secured to a fixed panel 46 and an adjacent partition 72. Bolts 86 may be used as the securing means. Since each partition meets its fixed panel 46 at the midportion of the latter, there will be a clean-out and/or ventilating opening 56 for each sow compartment. Further, these openings are at the ends of adjacent compartments in which the sows' rears are confined, thus facilitating the clean out task. Since the sow is thus confined there is no tendency for her to spread excreta over her entire floor.

As stated, each sow compartment is "tailored" to fit the sow and she will occupy her compartment with her rear at the end having the short guard bar and her head at the opposite end, and for this reason it is convenient to equip each of said opposite ends with a generally triangular feed pan 88. As a further convenience, the pans 88 in adjacent compartments are mounted adjacent each other, being separated of course by the intervening partition 72, and these pans respectively have brackets 90 slidably mounted in common on the associated rod or post 76 for vertical movement between a lower feeding position and an upper filling position (Figure 9). It is in this respect that the combinative effect of the bi-directionally mounted swingable panels 48 will be noted, since each panel can thus be used to guide the sow into her compartment to head toward the feed pan. Likewise, the panel 48 may be opened in the proper direction to enable the sow to walk out forwardly. When she farrows, the small pigs are protected by the guard bar 84, and the small pigs are additionally protected when feeding by the guard bar 82 and the lower edge of the panel 62 which affords the associated ingress and egress opening 64. Also, the pigs can seek shelter beneath the feed pan. When the small pigs move about and away from their mother, they will be funneled toward their own associated central compartment P, to and from which they move naturally via the opening 64. A floor covering 92 of rigid waterproof material may be used if desired in the central structure. The bars 82 and 84 increase the rigidity of the entire structure because of their bracing effect. The bars 82 are of course low enough for the sows to step over (Figure 5) when they enter and leave their respective compartments.

The triangular shape of each feed pan 88 gives it angularly related sides which abut the surfaces of the proximate partition 72 and fixed panel 46, the pan thus nesting in the corner and enabling the use of the simple sliding bracket 90 which, when the pan is raised, frictionally locks to the rod by the weight of the pan. The pans are stopped in their lower positions when their brackets abut the respective lower eye bolts 74 (Figure 10). The front of each pan bridges across the pointed end of the compartment and further adds to the "tailoring" of same.

In summer use of the pen, the central structure C may be closed with the cover or lid L which has a central opening 94 in which is mounted a suitable electric fan 96 as means for drawing air in through the outer openings 56, across the sow compartments S, through the inner openings 64 and up through the central structure as a chimney. The lid L may be of any suitable insulating material for winter use, at which time the opening 94 is closed, or a replacement lid may be used, supplemented by the use of conventional heat lamps as at 98 (Figure 4), suspended in any suitable fashion. Reversal and/or adjustability of the doors or shutters 58 may be resorted to according to the season and results desired. In the circulation of air in the summer, an evaporative effect is created because of the moisture on the floor.

The foregoing relates to, as said above, a preferred construction featuring such significant things as portability; ease of construction, shipment, storage, assembly and disassembly; the "tailored" sow compartments; panel construction; ventilation and heating and cooling; maximum accommodation of sows and pigs in a minimum of floor space; advantageous utility regardless of the building in which it is used, since it is self-contained, requires no complicated wiring, etc.; novel design which avoids draft-proof construction with no open corners; ready accessibility to the animals for feeding, care, etc.; the freely swingable panels which make it easy for the sows to enter and leave and also aid the user in guiding and directing the sows; the improved elevated floor requires less bedding, and moisture escapes through the floor rather than at the sides; and better sanitation control. Features and advantages in addition to these will readily occur to those versed in the art, as will many modifications in the embodiment disclosed, all of which may be achieved without departure from the spirit and scope of the invention.

What is claimed is:

1. A farrowing pen, comprising: a floor; an outer peripheral wall structure rising from the floor as a regular octagon made up of eight similar rectangular panels, each panel having opposite upright edges and said panels being arranged with each edge of each panel meeting a proximate edge of an adjoining panel to form the eight corners of the octagon, alternate panels being secured to the floor to constitute four fixed panels and the remaining panels constituting four movable panels having closed positions normally cooperating with the fixed panels to establish the octagon; a plurality of upright hinge means secured to and rising from the floor, one for mounting each fixed panel to the floor and also for hinging each movable panel at one edge thereof to a meeting edge of an adjoining fixed panel for selective swinging of said movable panel outwardly to an open position; a plurality of lock means, one for and releasably securing each movable panel in its closed position; a central upright wall structure smaller than and concentrically surrounded by the outer wall structure so that an annular space is afforded between said structures, said central wall structure having its lower marginal edge portions spaced above the floor for communication between the annular space and the interior of said central structure; four upright partitions in the annular space and spaced angularly about the central structure and joined to and radiating from said central structure and joined respectively to the fixed panels exclusively to the movable panels to afford four outer compartments to which access is had via the respective movable panels; and partition means dividing the interior of the central structure into four interior compartments respectively in communication with the four outer compartments beneath the lower marginal edge portions of said central structure.

2. The invention defined in claim 1, in which: the central structure is in the form of a square having four walls respectively parallel to the four movable panels and four corners spaced radially inwardly respectively from midportions of the fixed panels; and the four partitions extend respectively from said four corners to the proximate midportions of said fixed panels.

3. The invention defined in claim 2, in which: each wall of the central structure is of the same length as its paralleling movable panel; and each of the four partitions has a length one-half that of each of said four walls.

4. The invention defined in claim 1, in which: each hinge means comprises a pair of vertically coaxial pin elements and a pair of cooperating loop elements on the respective movable panel whereby said movable panel is vertically removable; and each lock means is similar to each hinge means and is located at the opposite edge of each movable panel and cooperates with the other adjoining fixed panel so that each movable section is optionally swingable about either of its upright edges.

5. The invention defined in claim 1, in which: each hinge means comprises a pair of vertically spaced apart upright coaxial pin elements and a pair of similarly vertically spaced pin-receiving members on the respective movable panel whereby said movable panel is vertically removable.

6. A farrowing pen, comprising: an outer peripheral wall structure in the form of a regular octagon made up of eight similar rectangular panels, each panel having opposite upright edges and said panels being arranged with each edge of each panel meeting a proximate edge of an adjoining panel to form the eight corners of the octagon, alternate panels constituting four fixed panels and the remaining panels constituting four movable panels having closed positions normally cooperating with the fixed panels to establish the octagon; a plurality of upright hinge means, one for supporting each fixed panel and also for hinging each movable panel at one edge thereof to a meeting edge of an adjoining fixed panel for swinging outwardly to an open position; a plurality of lock means, one for and releasably securing each movable panel in its closed position; a central upright wall structure smaller than and concentrically surrounded by the outer wall structure so that an angular space is afforded between said structures, said central wall structure having its lower marginal edge portions spaced above the plane of the bottom edges of the outer structure for communication between the annular space and the interior of said central structure; four upright partitions in the annular space and spaced angularly about the central structure and joined to and radiating from said central structure and joined respectively to the fixed panels exclusively of the movable panels to afford four outer compartments to which access is had via the respective movable panels; and partition means dividing the inments respectively in communication with the four outer compartments beneath the lower marginal edge portions of said central structure.

7. The invention defined in claim 6, in which: the central structure is in the form of a square having four walls respectively parallel to the four movable panels and four corners spaced radially inwardly respectively from midportions of the fixed panels; and the four partitions extend respectively from said four corners to the proximate midportions of said fixed panels.

8. The invention defined in claim 7, in which: each wall of the central structure is of the same length as its paralleling movable panel; and each of the four partitions has a length one-half that of each of said four walls.

9. A farrowing pen, comprising: a plurality of separate upright panels arranged to form an outer peripheral wall structure adapted to rest on the ground, each panel having opposite upright edges and each edge of each panel meeting an edge of an adjoining panel; alternate panels constituting fixed panels and the remaining panels constituting movable panels equal in number to the fixed panels; a plurality of upright hinge means, one for mounting each fixed panel and also for hinging each movable panel at one edge thereof to the proximate edge of the adjoining fixed panel for selective swinging of said movable panel between open and closed positions; a plurality of lock means, one for and releasably locking each movable panel in its closed position; a central smaller upright wall structure within and surrounded by the outer wall structure to afford an annular space between said structures; a plurality of upright partitions equal in number to the fixed panels and secured to and radiating from the central structure respectively to and secured to the fixed panels exclusively of the movable panels and uniformly angularly spaced about said central structure to divide the annular space into separate outer compartments equal in number to and respectively accessible via said movable panels; and partition means dividing the interior of the central structure into a number of compartments equal to and generally in radial register respectively with said outer compartments, and said interior structure having a plurality of ground-proximate openings, one for each interior compartment and its registering outer compartment so as to afford access between said registering compartments.

10. The invention defined in claim 9, in which: each fixed panel has a pair of ground-proximate openings therein, one at each side of its junction with a partition; and each fixed panel is equipped with a pair of closure members, one for covering and uncovering each opening.

11. A farrowing pen, comprising: a central upright annular wall structure having partition means dividing said structure into a plurality of small-pig compartments; and said structure having a plurality of lower openings affording radial ingress and egress respectively for said compartments; an annular outer wall structure surrounding said central structure to provide an annular space about said structure, said outer structure being made up of a plurality of similar separate upright panels; a plurality of upright partitions joined to and extending radially outwardly form the central structure and joined to alternate panels exclusively of other of said panels to divide the annular space into a plurality of sow compartments equal in number to and generally in radial register respectively with the small-pig compartments via said ingress and egress openings; and means removably interconnecting the other panels respectively to said alternate panels for individual opening of said other panels relative to said alternate panels to afford access to the respective sow compartments, said interconnecting means including a hinge between each other panel and an adjoining alternate panel whereby each of said other panels may be swung bodily as a unit between open and closed positions.

12. A farrowing pen, comprising: a square central upright annular wall structure having four walls and partition means dividing said structure into four small-pig compartments, and said structure having a plurality of lower openings affording radial ingress and egress respectively for said compartments; an octagonal annular outer wall structure surrounding said central structure and having light walls to provide an annular space about said structure; four upright partitions joined to and extending radially outwardly from the corners of the central structure and joined to midportions of four alternate walls of the outer structure to divide the annular space into four sow compartments in radial register respectively with the small-pig compartments via said ingress and egress openings; and said partitions being angularly related to said alternate walls and parallel to the other four walls of said outer wall structure to give each sow compartment opposite symmetrical tapered ends and flat sides and said partitions and walls being so dimensioned as to provide each sow compartment with substantial length measured peripherally of said structures and a relatively narrow width measured radially of said structures, said tapered ends in each sow compartment being adapted respectively to confine the head and rear of a sow whereby to prevent the sow in each sow compartment from turning end for end and to compel such sow to lie parallel to the respective ingress and egress opening.

13. A farrowing pen, comprising: a floor; a plurality of hinge posts rising from and secured to the floor and arranged at the eight corners of an octagon; a plurality of upright panels, one spanning each pair of peripherally adjacent posts and arranged to form an octagonal outer wall structure; panel-mounting means respectively on the panels and cooperating with the respective posts to mount the panels on the posts for downward attachment and upward detachment while the posts remain secured to the floor; a central wall structure concentrically within and surrounded by the octagonal wall structure to thereby afford an annular space between the structures; partition means dividing the central structure into four small-pig compartments, said central wall structure having lower openings establishing radial communication between each small-pig compartment and said annular space; four upright radial partitions spaced apart angularly in the annular space and extending from the central structure respectively to alternate panels of the octagonal wall structure to divide the annular space into sow compartments respectively in radial register with the small-pig compartments; and means securing each partition to the central structure and to the proximate one of said alternate panels exclusively of the remaining panels, leaving the remaining panels as movable doors respectively for sow compartments.

14. A farrowing pen, comprising: a floor; a plurality of hinge posts rising from and secured to the floor and arranged at the corners of a regular polygon; a plurality of upright panels, one spanning each pair of peripherally adjacent posts and arranged to form an outer wall structure in the shape of such regular polygon; panel-mounting means respectively on the panels and cooperating with the respective posts to mount the panels on the posts for downward attachment and upward detachment while the posts remain secured to the floor; a central wall structure concentrically within and surrounded by the outer wall structure to thereby afford an annular space between the structures; partition means dividing the central structure into a plurality of small-pig compartments, said central wall structure having lower openings establishing radial communications between each small-pig compartment and said annular space; a plurality of upright radial partitions spaced apart angularly in the annular space and extending from the central structure respectively to certain of the panels of the outer wall structure to divide the annular space into sow terior of the central structure into four interior compart-compartments respectively in radial register with the small-pig compartments; and means securing each partition to the central structure and to the proximate portion of the outer wall structure, said panel-mounting means enabling movement of certain of the panels to afford doors respectively for the sow compartments.

References Cited in the file of this patent
UNITED STATES PATENTS

| | | |
|---|---|---|
| 1,708,098 | Karley | Apr. 9, 1929 |
| 2,222,680 | Morris et al. | Nov. 26, 1940 |
| 2,368,523 | Cowbourne | Jan. 30, 1945 |
| 2,678,629 | Meyer | May 18, 1954 |